United States Patent
Makihira et al.

(10) Patent No.: US 7,221,486 B2
(45) Date of Patent: May 22, 2007

(54) METHOD AND APPARATUS FOR PICKING UP 2D IMAGE OF AN OBJECT TO BE SENSED

(75) Inventors: Hiroshi Makihira, Yokohama (JP); Shunji Maeda, Yokohama (JP); Kenji Oka, Yokohama (JP); Minoru Yoshida, Yokohama (JP); Yasuhiko Nakayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 927 days.

(21) Appl. No.: 10/265,659

(22) Filed: Oct. 8, 2002

(65) Prior Publication Data

US 2003/0030853 A1  Feb. 13, 2003

Related U.S. Application Data

(63) Continuation of application No. 09/105,222, filed on Jun. 26, 1998.

(51) Int. Cl.
*H04N 1/04* (2006.01)

(52) U.S. Cl. .................. 358/486; 382/167; 382/117; 359/212; 352/58; 352/81

(58) Field of Classification Search ............ 382/194, 382/167, 117, 298; 358/486, 496, 497, 505, 358/504, 474; 359/221, 212; 352/53, 58, 352/81

See application file for complete search history.

(56) References Cited

U.S. PATENT DOCUMENTS

| | | | |
|---|---|---|---|
| 5,278,581 A | | 1/1994 | Fukuyama |
| 5,539,487 A | * | 7/1996 | Taguchi et al. ............ 396/330 |
| 5,801,870 A | | 9/1998 | Oka |
| 5,847,884 A | * | 12/1998 | Kamon et al. ............ 359/806 |
| 5,987,151 A | | 11/1999 | Akashi |
| 6,128,120 A | * | 10/2000 | Mushiake et al. .......... 359/221 |

FOREIGN PATENT DOCUMENTS

| | | |
|---|---|---|
| JP | 62-225081 | 10/1987 |
| JP | 6-133209 | 5/1994 |
| JP | 11-14550 | 1/1999 |

* cited by examiner

*Primary Examiner*—Kimberly Williams
*Assistant Examiner*—Negussie Worku
(74) *Attorney, Agent, or Firm*—Antonelli, Terry, Stout & Kraus, LLP

(57) ABSTRACT

A method and apparatus for sensing by a linear image sensor a two-dimensional image of an object to be sensed includes detecting a position of the object by a position sensor having a first resolution, picking up an image of the object being projected in a direction (V-scan direction) generally perpendicular to an internal scan (H-scan) direction of the linear image sensor in synchronism with relative movement between the object and the linear image sensor, periodically switching a pixel size along the V-scan direction between a plurality of predefined pixel sizes during the relative movement between the object and the linear image sensor in accordance with information of the relative movement detected by the position sensor, and producing from an output of the linear image sensor a two-dimensional image of the projected image having a second resolution of the object to be sensed. The second resolution is a higher resolution than the first resolution.

17 Claims, 10 Drawing Sheets

METHOD AND APPARATUS FOR PICKING UP 2D IMAGE OF AN OBJECT TO BE SENSED

CROSS REFERENCE TO RELATED APPLICATION

This is a continuation of U.S. application Ser. No. 09/105,222, filed Jun. 26, 1998, the subject matter of which is incorporated by reference herein.

BACKGROUND OF THE INVENTION

The present invention relates in general to visual inspection apparatus and, in particular, to image detection technology for use with such apparatus. More particularly but not limited to, the invention relates to image pickup devices for use in detecting a two-dimensional (2D) image of an object to be sensed through the main scanning (H scanning) and subsidiary scanning (V scanning) operations.

One typical approach to detection of a 2D image using a linear image sensor is to read image data out of the linear image sensor while simultaneously permitting a projection image of an object being sensed on the image formation plane to move in a direction perpendicular to the linear image sensor, wherein the internal scanning (H-scanning) gets started every time the projected object image moves a distance corresponding to a single pixel (V-scanning). This H-scan distance may be the size of one pixel in the V direction.

For detection of a movement amount (V-scanning) of the object image in this case, a scale for use in detecting the coordinate system of a workpiece mount table is employable, by way of example.

Currently available scale and its associative detection scheme for detecting the movement amount or coordinates (position) of an object being sensed may include a variety of types of techniques based on various principles, such as the transmitted light detection scheme, diffraction light interference scheme and the like. In any one of these approaches, a graduation detection signal is of a sinusoidal waveform having two phases—phase "A" and phase "B"—with the phase difference of 90°, the sine-wave signal being wave-shaped into a pulse signal for use as a coordinate signal.

In addition, in order to obtain a higher degree of resolution than the graduation of scale, a certain scheme is widely employed which employs a divider circuit for dividing the period of a graduation detection signal into several tens of segments or more.

The term "scale resolution" as will be used in the description below refers to the resulting degree of resolution after execution of the period division processing, rather than the resolution of the scale per se.

It is also noted that the term "scale detection pulse" as used herein refers to a pulse signal obtainable after execution of the division processing in cases where the period is divided.

Conventionally, setup of a pixel size along the movement (in the V direction) of the object to be sensed is such that the scale detection pulse is such that the scale detection pulse is frequency-divided at a predefined frequency division ratio to provide an internal scan start signal of a linear image sensor used. This is because the linear image sensor is internally scanned at equal distances or intervals each equivalent to the pixel size.

Note that one prior known technique for variable control of the accumulation time length in order to control the detection sensitivity of a linear image sensor is disclosed in JP-A-62-225081.

Another technique is disclosed in JP-A-6-133209, which is to deal with CCD shift clocks independently of each other at the upper and lower ends of a known time delay and integration (TDI) image sensor in the case where an image within a pickup view filed is different in movement speed or rate between the upper and lower ends, thereby equalizing them to respective image movement rate values.

SUMMARY OF THE INVENTION

In visual inspection apparatus for use in inspecting the quality of a workpiece under manufacture including a semiconductor wafer or membrane, where comparative inspection is carried out with respect to repetitive patterns, it is desirable that two images under comparison be sensed or picked up in a way such that the pattern period or cycle is an integer multiple of the pixel size to thereby ensure that the resultant pattern-to-pixel positional relation is kept constant in any events.

More specifically, as shown in FIG. 5, when comparing patterns 51a and 51b to each other, it is desirable to compare image information items detected at pixels 61 and 62 that are identical to each other in pattern-to-pixel positional relation; to this end, the distance of such comparative patterns may be an integer multiple of the pixel size. Unless the comparative pattern distance is an integer multiple of the pixel size, detection might be done at a position such as a pixel 63 with respect to the pattern 51b, for example. In such a case, the resultant image information could contain some errors even when no differences are present in the patterns per se, which would result in correct comparison result being no longer expectable.

Conventionally, in an image pickup device of the type which detects a 2D image by use of a linear image sensor while moving (V scanning) an object to be sensed, the pixel size in the V direction is set by starting the internal scanning of such linear image sensor every time an object being sensed moves or travels a fixed distance, i.e. one pixel size.

In cases where a detection pulse of an object V-coordinate detection scale is utilized as the internal scan start signal of the linear image sensor, the unit of a minimal variable amount of such image sensor scan start signal is the resolution obtainable from the scale (either the resolution of graduation or a resolution as divided therefrom by signal processing), which is a digital value.

Accordingly, when a given distance segment L is divided by a pixel number M, the minimal variable amount relative to a distance corresponding to M pixels might be equal to the "M multiplication of the scale resolution," which results in difficulty in any precise adjustment. In other words, when the distance L=K·lu (where K is a given integer, and lu is the scale resolution), the pixel number capable of equally dividing the distance L is limited only to those divisors of the integer K.

For example, suppose that a given distance L=525 lu is to be divided into fifty pixels. If the pixel size=10 lu, then the result is (52 pixels+reminder 5 lu). In this respect, when the pixel size is enlarged or expanded by a minimal variable amount 1 lu obtaining the value 11 lu, the resultant pixel number is equal to (47 pixels+reminder 8 lu). Obviously, this value is far less than the target value of fifty pixels, which in turn makes it impossible to set at the desired pixel number.

In the case of such image pickup device using a TDI image sensor, it is the basic condition for guaranteeing achievement of normal operations of the TDI image sensor to let the distance on an object plane, which distance corresponds to the total TDI stage number, be exactly an integer times the pixel size in order to ensure that a packet of accumulated or "integrated" charge carriers at one TDI stage is sequentially transferred to its neighboring TDI stage in synchronism with movement of an image formed on the photosensitive surface of the TDI image sensor.

Unfortunately, as in the case described previously, presence of the limitation to the coordinate detection resolution can make it difficult, in many cases, to divide the distance on the object plane corresponding to the TDI stage number into the TDI stage number. In addition, the more the TDI stage number, the higher the required pixel size setup accuracy. For example, consider that the TDI stage number is ninety six (96). If the pixel size is increased or decreased by the scale resolution 1 lu which is the minimum variable amount, then the resulting minimum increase/decrease amount in the distance corresponding to such 96 pixels is 96 lu, which makes it impossible, or at least greatly difficult, to provide the intended fine or precise adjustability.

It is therefore an object of the present invention to provide an inspection apparatus for performing visual inspection of an object to be sensed by detecting a 2D image through the main and sub-scanning operations, which apparatus is capable of dividing a desired distance segment along the sub-scanning direction into a desired pixel number.

It is another object of the invention to provide an inspection apparatus for performing visual inspection of a to-be-sensed object by detecting a 2D image through the main and sub-scanning operations, which is capable of setting the pixel size in the sub-scanning direction at an accuracy higher than the scale resolution of an X-Y stage used.

It is still another object of the invention to provide a visual inspection apparatus capable of setting the positional relation of a detection image pattern versus pixels at high accuracy and thus preferably applicable to comparative inspection for repetitive patterns of semiconductor wafers or the like during visual inspection.

In accordance with one aspect of the invention, an image pickup method is provided which picks up a 2D image while causing a projection image of an object of interest as projected onto a linear image sensor to move relative to the linear image sensor in a specific direction (V-scan direction) that is at right angles to the internal scan (H scan) direction of the linear image sensor, and which detects an image while switching the pixel size in the V-scan direction between or among different values during image pickup operations.

In accordance with another aspect of the invention, an image pickup method is provided which picks up a 2D image by permitting a projection image of an object to be sensed that is projected onto a linear image sensor to move relative to the linear image sensor in the V-scan direction perpendicular to the H scanning direction of the linear image sensor, and which detects the 2D image while periodically changing or varying the interval of start pulses for the H scanning.

In accordance with still another aspect of the invention, an image pickup method is arranged to pick up, when a 2D image is picked up while causing a projection image of an object being sensed as projected onto a TDI image sensor to move relative to the TDI linear image sensor, such 2D image of the object is sensed while letting an amount of relative movement vary with time within the total accumulation or "integration" time periods of the TDI image sensor.

In accordance with yet another aspect of the invention, an image pickup device for use in sensing a 2D image while permitting a projection image of an object of interest as projected onto a linear image sensor to move relative to the linear image sensor in the V-scan direction perpendicular to the H-scan direction of the linear image sensor, the device including position detection means for detecting a position of the object, and pixel size modification means for altering or modifying the setting of the pixel size in the V-scan direction of the linear image sensor on the basis of a position detection signal indicative of the position of the object as detected by the position detection means during image pickup of the linear image sensor.

In accordance with a further aspect of the invention, an image pickup device is provided for picking up a 2D image of an object being sensed by projecting an image of the object onto a linear image sensor while simultaneously letting this projected object image move relative to the linear image sensor in the V-scan direction perpendicular to the H-scan direction of the linear image sensor, the device including position detector means for detecting a position of the object, and start control means for periodically changing or varying the start interval of the H-scanning of the linear image sensor on the basis of a position detection signal representative of the position of the object as detected by the position detector means during image sensing operations.

In accordance with a still further aspect of the invention, an image pickup device is operable to sense a 2D image of an object to be sensed by projecting an image of this object onto a TDI image sensor while at the same time letting this projected object image move relative to the TDI image sensor, the device including position detector means for detecting a position of the object, and control means for varying with time the amount of such relative movement within the total accumulation time period of the TDI image sensor on the basis of a position detection signal indicative of the object position detected by the position detector means during image pickup operations of the TDI image sensor.

In accordance with the principles of the invention, in cases where the target value of pixel size is not an integer times the scale resolution, the pixel size is not set at any fixed value; instead, the H-scan interval greater than the target value (i.e., positive (+) errors) and the H-scan interval less than the target value (i.e., negative (−) errors) are combined together rendering the average pixel size at a divided distance segment L coincident with the target pixel size, thereby enabling subdivision into any desired pixel number. This is done under the condition that certain possible errors corresponding to the scale resolution is acceptable with regard to the size and position of each pixel, except that the divided distant segment L is several times the scale resolution. Note here that the target pixel size value is definable by "divided distance segment L÷division pixel number."

One preferable way of combining two kinds of H-scan intervals—i.e. the pixel sizes—is to array the H-scan intervals in a manner which ensures that the average pixel size value within the prescribed given distance segment on the object plane is identical to the target pixel size while at the same time any possible position errors of respective pixels relative to calculation-determinable ideal pixel positions are prevented from accumulating beyond a predefined allowable value. More specifically, the both H-scan intervals, which can have errors of positive (+) and negative (−) polarities with respect to the target pixel size, are arrayed in a way such that resultant accumulated values of positional errors each being caused by one of the H-scan intervals and subsequent the other one do not increase exceeding the allowable value, thereby ensuring that both the sizes and positions of all the pixels fall within a predefined allowable error range.

DETAILED DESCRIPTION OF THE PREFERRED EMBODIMENTS

Figure 1:
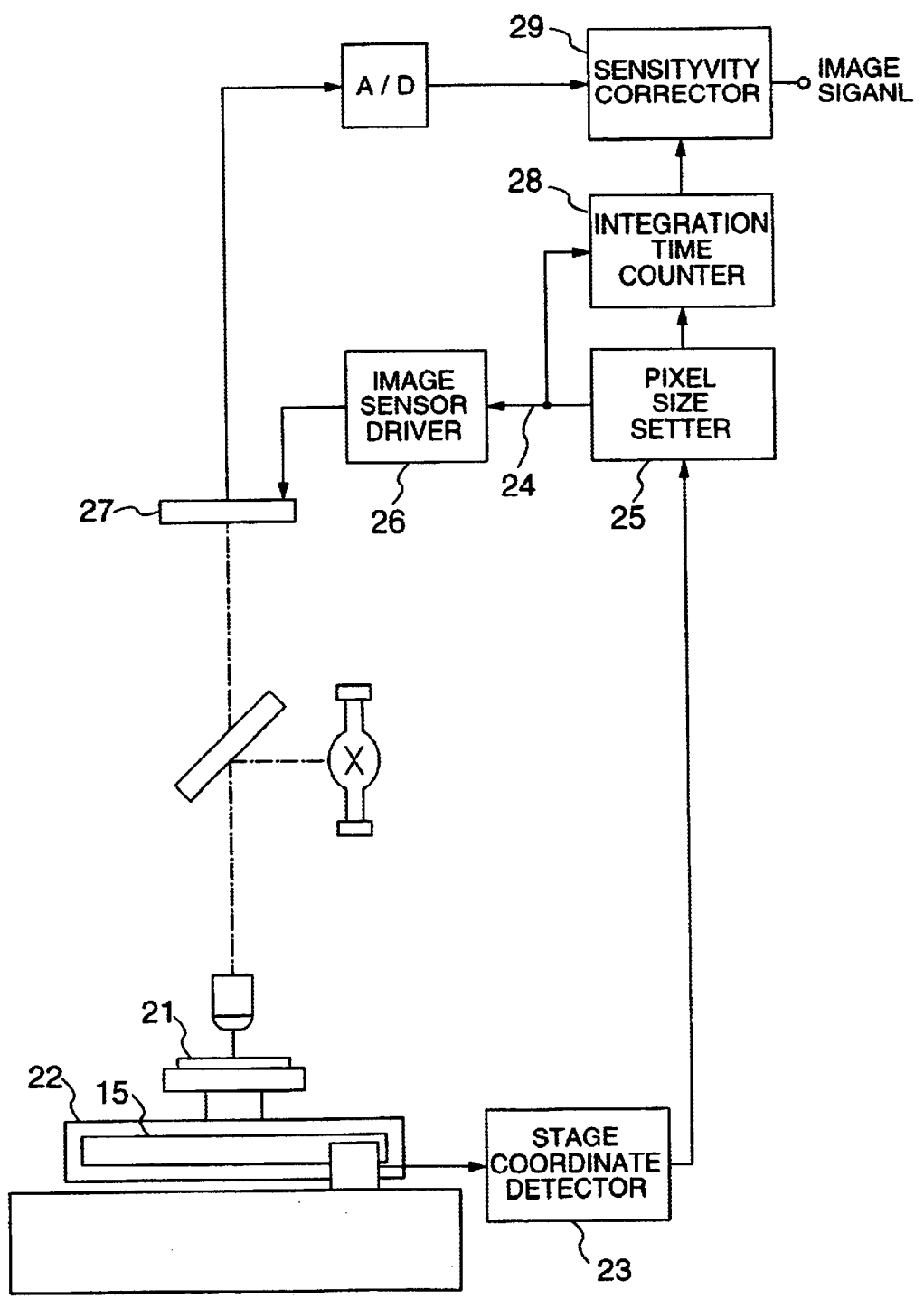
FIG. 1 is a block diagram schematically showing a configuration of an image pickup device in accordance with the present invention.

Some preferred embodiments of the present invention will be explained with reference to the accompanying drawing. Note that like reference numerals are used to designate like parts or components.

FIG. 1 is a block diagram showing a configuration of an image pickup device in accordance with one preferred embodiment of the present invention.

As shown in FIG. 1, a wafer 21 which is a to-be-sensed object is mounted on an X-Y stage 22. A linear image sensor 27 is provided for sensing or picking up a pattern of the object through an associated optical system for image focussing/formation. The linear image sensor 27 is operable to derive at its output an image signal, which is then converted to a corresponding digital signal for input to a sensitivity correction/modifier circuit 29. Note that in FIG. 1, analog video circuitry at the prestage of the analog-to-digital (A/D) conversion of the image signal is eliminated from illustration.

The X-Y stage is driven to move in the X direction perpendicular to the internal scanning (H-scan) direction of the linear image sensor 27. An amount of movement of the X-Y stage is detected by an X-coordinate detecting scale 15 via a stage coordinate detector 23, providing a scale detection pulse of a predefined resolution.

The scale detection pulse is coupled to a pixel size setting circuit 25. This pixel size setter 25 outputs an internal scanning start signal 24 to an image sensor drive circuit 26 every time the detected movement amount becomes identical to a predetermined pixel size, thereby obtaining a 2D image.

On the other hand, an accumulated time counter 28 measures the period of the internal scan start signal 24 to generate a measurement result, which is then input to a sensitivity modifying circuit 29 for appropriate modification or correction of an image signal. In other words, as the sensitivity of the image sensor 27 is proportional to the accumulated time length, the intended normalization is executable based on the accumulated time.

Figure 6:
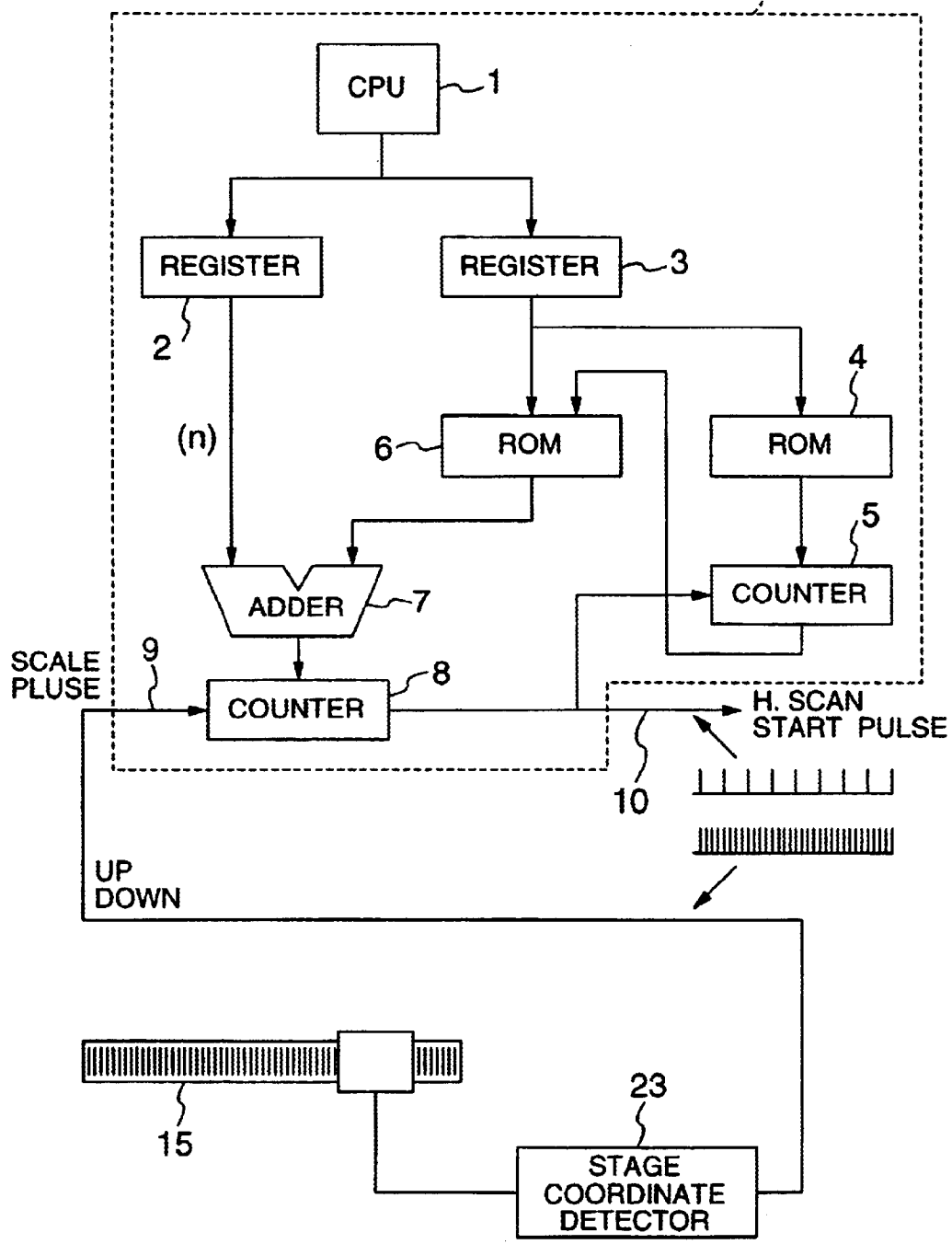
FIG. 6 is a block diagram of a pixel size setup circuit in accordance with one embodiment of the invention.

A pixel size setup method in accordance with the principles of the present invention is related to the function of the pixel size setter circuit 25 of FIG. 1. Note here that the pixel size setter (modifier) circuit 25 is operable to supply the internal scan start signal 24 to the image sensor driver circuit 26 for control of startup of the internal scanning operation of the linear image sensor 27; in this respect, this circuit 25 will also be called the "internal scan start control circuit." An internal configuration of the pixel size setter circuit (internal scan start control circuit) 25 is shown in FIG. 6.

An explanation will now be given of the embodiment with respect to one exemplary case where the distance segment or block L (L=18 lu) is divided into four pixels in conjunction with FIGS. 2 to 5.

Figure 2:
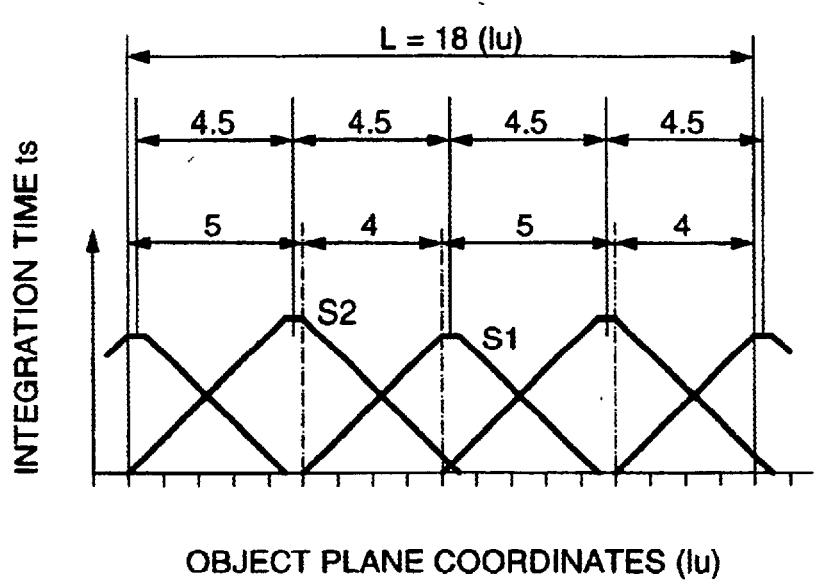
FIG. 2 is a graph showing a relation of a detectable range on an object plane versus an accumulation time distribution (detection sensitivity) within the range.

FIG. 2 is a graph showing the relation of a detection range per pixel on the plane of an object being sensed versus an accumulation time distribution within such range, wherein the transverse axis indicates the coordinates in the object movement direction by the scale resolution "lu" whereas the vertical axis is the accumulation time (exposure time length). The accumulation time may correspond to the sensitivity.

Regarding the internal scan (H-scan) interval of the image sensor, since the H-scan start signal is issued at a position of the scale resolution lu, the H-scan interval is exactly an integer multiple of the scale resolution lu, namely, the former equals to the latter multiplied by an integer. Accordingly, simple use of a uniform H-scan interval as in the prior art makes it impossible to divide 18 lu by 4 pixels (H-scan interval).

Setting of the H-scan interval at 4 lu would cause a remainder of 2 lu. Setting at H-scan interval=5 lu would exceed 18 lu for four pixels.

In the present invention, combining two kinds of H-scan intervals enables the 18 lu block to be divided into 4 pixels, wherein the H-scan intervals to be combined are selected at 4 lu and 5 lu, which are those natural numbers or integers that are minimal in "+ error" and "– error" with respect to the target value, i.e., 18 lu÷4=4.5 lu. A combination pattern is determined to ensure that the average value of these combined integers is identical to the target value.

For purposes of simplicity of explanation, the illustrative embodiment assumes that the target value is obtainable by a simple combination. In this case, in order to obtain the target value 4.5 lu, 4 lu and 5 lu may be combined at the ratio of 1:1. More specifically, the scan intervals of 4 lu and 5 lu are in an alternately combined pattern. In other words, the combination pattern of such two kinds of pixel sizes is 2 pixels.

FIG. 2 shows the detection range per pixel and the detection sensitivity when the H-scan intervals of 4 lu and 5 lu are combined together, wherein certain areas designated by S1, S2 represent the pixel signal detection sensitivity. Additionally, this diagram assumes that a photoelement has an ideal size with its aperture ratio of 100%.

Figure 3:
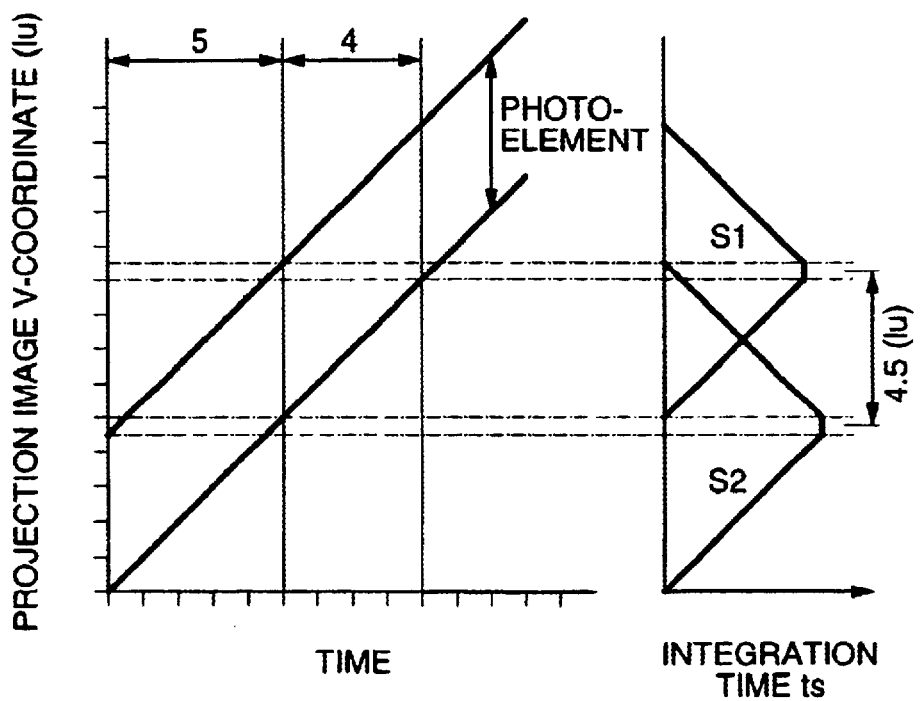
FIG. 3 is another graph useful for explanation of FIG. 2.

The reason why the foregoing characteristics were obtained is shown in FIG. 3. In this drawing, the left-half part is such that the transverse axis indicates a time taken for an object image to move, which axis is graduated in a time unit as taken for the X-Y stage of a constant rate to travel a distance corresponding to the scale resolution lu. The vertical axis is the V coordinate of the object image projected onto the image formation plane of the image sensor, which axis indicates a positional relationship in which the photoelement of the image sensor moves over the object image. The graduation of the vertical axis is the scale resolution lu, wherein the image-formation magnification is preset letting the target pixel size value 4.5 lu be equal to the photoelement size. Two parallelograms in the drawing indicate the manner how the detection range moves due to the V-scanning, wherein the lateral direction of such parallelograms designates the accumulation time whereas the longitudinal direction is the detection range.

The right-half part of FIG. 3 rewrites the relation of the detection range and accumulation time, for indicating that the value is S2 when the scan interval is 5, and S1 if 4 in a way corresponding to the position of the photoelement shown in the left part of FIG. 3.

FIG. 2 is the graph applying the aforesaid relation to four-divided distance segments, which indicates that the scan interval is repeated at 4 lu and 5 lu alternately with a distance of the center points of adjacent detection ranges being uniformly kept at 4.5 lu, thus representing the state that the distance segment L is four-divided.

Figure 4:
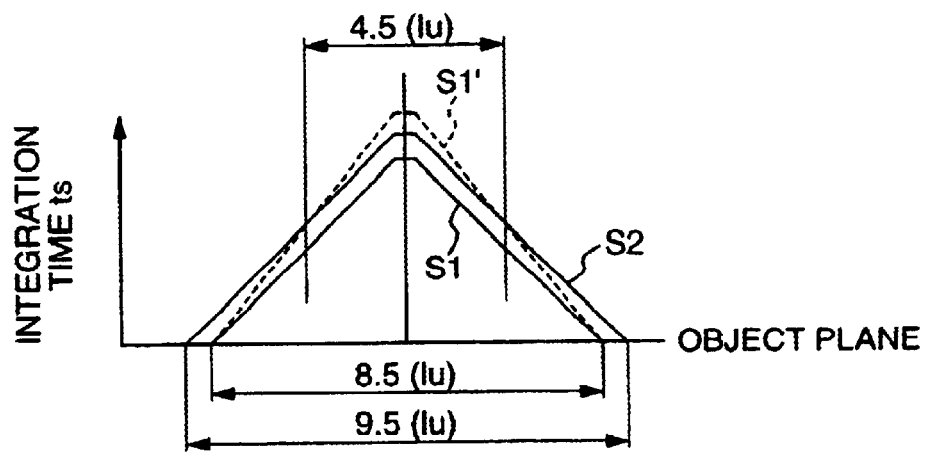
FIG. 4 is a graph showing a relation of a detection range on the object plane versus detection sensitivity.
Figure 5:
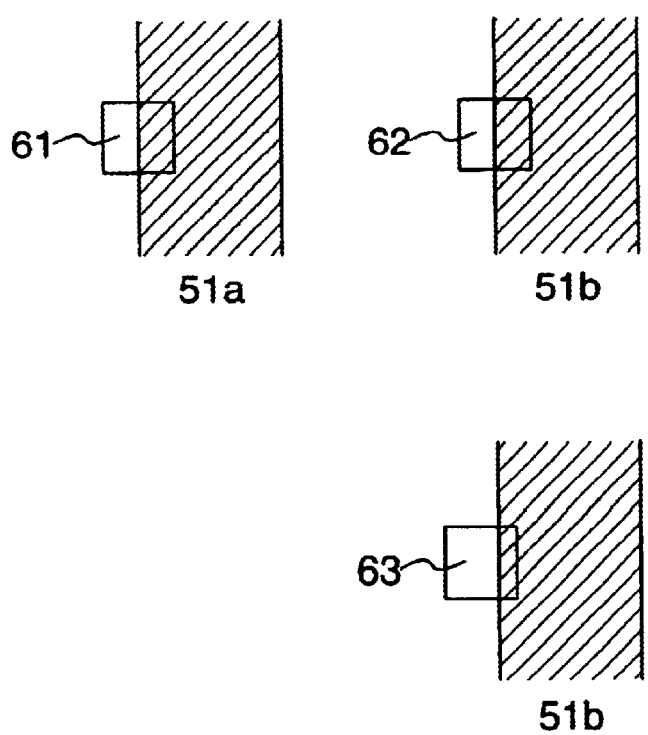
FIG. 5 depicts a plan view showing a relation of a detection pattern and pixel position.

It should be noted that when the H-scan intervals are set at 4 lu and 5 lu, the resulting detection range and the sensitivity are S1, S2, which are different as shown in FIG. 4. Fortunately, such sensitivity difference may be amendable or correctable by normalization of a pixel signal by a V-directional travel time as measured relative to the H-scan intervals (distances) in view of the fact that the accumulation time remains proportional to the H-scan intervals if the V-scan rate is constant. Based on this principle, the ratio of the H-scan intervals 4 lu and 5 lu is used to execute a correction with [S1×5/4], which results in S1' so that the sensitivity is equalized.

It must be noted that the detection range of S2 is slightly wider than S1'. However, this will hardly affect pixel signal components because of the fact that the detection range is low in sensitivity at the both ends thereof.

While the above example is simple in H-scan interval and in combination pattern of the H-scan intervals, the combination pattern will generally be more complex as the identical H-scanning intervals can continue in many cases. Nevertheless, the same goes with such cases in regard to the fact that any possible errors of the detection range and position is suppressed to be less than or equal to 1 lu.

An explanation will next be given of one exemplary scheme for combining two kinds of pixel sizes in the case the distance L is divided into M pixels, where M is the pixel number.

The basic approach for deciding how to combine two kinds of pixel sizes is to let any possible positional errors of all the pixels fall within a limited range of the scale resolution.

A target ideal position may be the position of a virtual pixel of the average size that is defined by the formula "distance L/pixel number M," which is a calculation-determinable ideal location independent of the scale resolution.

The two kinds of pixel sizes (H-scan intervals) to be actually combined together may have a positive-polarity (+) error and negative-polarity (−) error with respect to the ideal size. Accordingly, if those pixels with errors of the same polarity continue in a queue, then a deviation from the ideal position will increase.

In view thereof, certain pixels having errors of the opposite polarities are combined together for correction of positional errors to prevent positional errors from increasing beyond the allowable value. More specifically, combination is done to ensure that the average value of the pixel sizes of those pixels combined is equal to the ideal value.

It is noted that even where the average value is identical to the ideal value, it is still not preferable that a peak-to-peak error in the average distance segment becomes significant. It would be most preferable that the p—p error remains no greater than the scale resolution. Namely, it is desirable to use a pattern that permits errors to compensate for each other in a best possible shortened period. This is attainable by employing as the basic form of the combination pattern a specific combination (1:a) in which at least one of the two kinds of sizes of pixels is a single pixel.

It is also noted that "a," "b," "c" and "d" as will be used in the following explanation are integers.

One best possible simple form is a combination of (1:a) only. Next, the basic form is of a plurality of combinations. In the case the basic form is of two combinations, the results is a combination of (1:a) (c, (1:b) (d. When both of c, d are plural, this is a case where both (1:a) and (1:b) have their average value which exhibits errors with respect to the target pixel size. In this case also, a combination with a least one of c, d being paired is to be employed.

One actual way of combining them will be shown below.

First shown below are the relations as to the distance L, the pixel number M, the scale resolution lu and the like.

$$\text{Distance } L \quad L = K \cdot lu \tag{1}$$

where K: integer
lu: scale resolution $$\text{Average pixel size value } Pa \quad Pa = L/M = K \cdot lu/M \tag{2}$$

$$\text{Reference frequency-division ratio } n \text{ is obtainable by } K \div M = \text{integer } n \ldots \text{ remainder } B \tag{3}$$

wherein, the integer n is called the reference frequency division ratio.

$$\text{Division pixel number } M \quad M = A + B \tag{4}$$

where,
A: the pixel number when the pixel size is n·lu
B: the pixel number when the pixel size is (n+1)lu=the remainder of Equation (3).

Note that M possibilities are available for the combination of the frequency division ratios n and (n+1) with respect to the pixel number M, involving the case where the frequency division ratio is kept constant for all the pixels. This may be reworded in a way such that the minimum variable amount is lu in the case of setting a distance corresponding to M pixels. This minimum variable amount is averaged with the pixel number M to obtain "lu/M," which will be called the fine or precise adjustment amount.

The combination pattern is determinable by a method as will be described below.

First, from Equations (1)–(4), calculate the pixel number of two kinds of pixel sizes.

The pixel number of frequency division ratio n: A
The pixel number of frequency division ratio n+1: B
Next, obtain the combination pattern.

Case 1: When one or both of A, B is/are 1
   Combination pattern: a form in which A, B or B, A are arrayed.
   Period of combination pattern: division pixel number M Case 2: As a result of reduction of A/B, when either one of the resultant denominator and numerator is 1
   Combination pattern: a form in which the denominator and numerator resulted from the mathematical reduction are arrayed in a way similar to that of (1).
   Period of combination pattern: division pixel number M/(the greatest common divisor of A, B)

Case 3: Other cases

In this case, a plurality of combination patterns are available. These plural combination patterns are obtained for combination in the procedure which follows.

First, the greater one of A, B is divided by the less one of them, obtaining as the answer the "integer Q" and a "remainder R." Then, obtain the values A1, B1 of a combination pattern 1 (C1) presented below, and A2, B2 of a combination pattern 2 (C2), as well as the repeat number of respective combination patterns.

Case 3.1 [where A>B]
C1; A1=Q, B1=1, C1's repeat number c=B−R.
C2; A2=Q+1, B2=1, C2's repeat number d=R.

Case 3.2 [when B>A]
C1; A1=1, B1=Q, C1's repeat number c=A−R.
C2; A2=1, B2=Q+1, C2's repeat number d=R.

Where respective repeat numbers c, d of C1, C2 are both plural, then form a combination with a less one of them being set at 1. The resulting combination pattern will not always be singular in kind. Also, the way of arraying such combination patterns is such that these are arrayed to guarantee that both C1 and C2 are minimal in number of continuance.

The above is the method for setting the intended pixel size while ensuring that the distance L is exactly divided by a desired pixel number, and for preventing any possible positional errors of the individual resultant pixel relative to the ideal position from exceeding the scale resolution.

However, in cases where it is permissible to increase the allowable value of positional errors, there is a possibility of enabling simplification of the combination pattern by slightly increasing or decreasing from the specified distance L the period of the combination pattern of two different pixel sizes.

In addition, as far as it is permitted to increase the allowable value of pixel position errors, the combination pattern will possibly be simplified even where the combination pattern period of two kinds of pixel sizes is rendered identical to the distance L.

A block diagram of a pixel size setter circuit 25 that may achieve the foregoing functions is shown in FIG. 6. The illustrative circuitry is configured to let a CPU set the reference frequency division ratio n and precise adjustment amount. An operation thereof will be explained below.

First, determine and set parameters prior to a frequency dividing operation. The CPU designated by numeral 1 sets the reference frequency division ratio n to a register 2 while also setting the precise adjustment amount to a register 3. A ROM 4 prestores therein a frequency-division ratio combination pattern period (the pixel number M in the averaged distance segment) that may correspond to a precise or fine adjustment amount for input as an address signal. The ROM 4 is operatively responsive to designation of the fine adjustment amount, for outputting the pixel number data, which is then loaded into a counter 5.

The counter 5 operates to cyclically repeat a counting operation with the period of the pixel number M as given from the ROM 4, then constantly outputting a presently identified pixel number within the averaged period in a way such that counter 5 counts up H-scan start pulses 10 and then provides an output signal that indicates that the succeeding pixel to be next frequency-divided comes in what order of sequence of those pixels within the frequency-division ratio combination pattern. The output of counter 5 is passed to a ROM 6 as an address signal.

Upon designation of the fine adjustment amount along with the pixel number within the frequency-division ratio combination pattern, the ROM 6 functions to output the value "0" when the frequency division ratio of such pixel is n, or alternatively, "1" when n+1. The data is 1 bit. Thus, by employing data from the register 3 and counter 5 as the address signal, an appropriate frequency division ratio of the successive pixel may be sent to an adder 7 in conformity with the frequency division ratio combination pattern of a presently established fine adjustment amount, in a way such that 0 is output when the frequency division ratio of such pixel is n, or alternatively, 1 if (n+1).

An output of the adder 7 is in turn input as load data to a counter 8, which is operable to frequency-divide a scale pulse signal 9. The counter 8 operates to output as an H-scan start pulse 10 a frequency-division output that has been frequency-divided at the frequency division ratio loaded, while simultaneously attempting to load new frequency division ratio data. Then, counter 8 performs a frequency dividing operation with respect to a succeeding pixel to be next processed.

Additionally, while the circuit configuration is shown as the independent hardware in FIG. 1, part of it will possibly be replaced with software-based processing as executable by the CPU depending upon the scale pulse rate and CPU's execution rate. To be more specific, if the CPU offers sufficiently higher processing rate, then the functions of some components—including but not limited to the adder 7 and counters 5, 8—may be alternatively achieved by software-based processing of the CPU.

Figure 7:
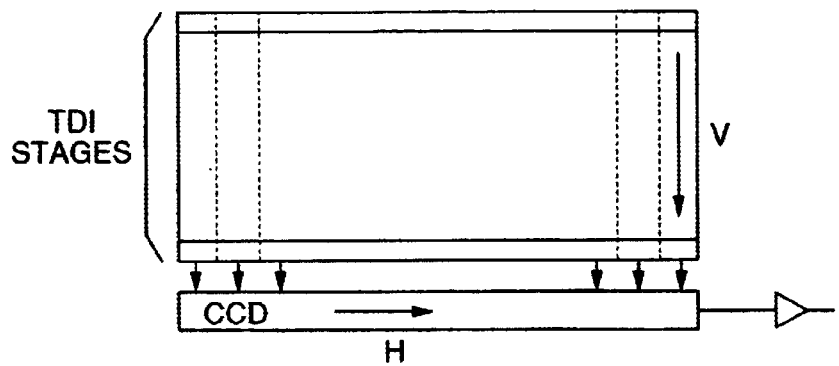
FIG. 7 is a diagram schematically showing an overall configuration of a TDI image sensor.

Next, an embodiment will be shown which is applicable to an image pickup device using a TDI image sensor. As shown in FIG. 7, the TDI image sensor typically includes a plurality of columns of linear photoelement arrays thereby constituting TDI stages. One typical configuration currently practiced is such that the column number of such photoelement arrays, namely the TDI stage number, is set at ninety-six (96) stages.

An image of an object or workpiece of interest being sensed as projected onto the image formation surface is moved in the V direction—that is, in the V-direction in FIG. 7. A packet of charge carriers detected at the TDI stages is sequentially transferred from one TDI stage to another TDI stage neighboring thereto while keeping track of movement of the object image. Accordingly, the pixel information of the object being sensed is output in such a way that the charge packet detected is successively accumulated or "integrated" from the first TDI stage up to the last TDI stage.

Thus, specific information may finally be obtained which averages the detection light amounts at respective TDI stages and the detection ranges thereof. Consequently, when rendering the period of a combination pattern of two kinds of pixel sizes (H-scan intervals) identical to the TDI stage number, the resulting total accumulation time period spanning from the first TDI stage to the last TDI stage may be kept constant in any events. Obviously, the total accumulation time remains also constant when the H-scan interval combination pattern period multiplied by a selected integer is rendered identical to the TDI stage number.

As a result, even when image detection is carried out with the H-scan intervals being varied, an output pixel signal is such that all the pixels are detected at an identical accumulation time, i.e. the same detection sensitivity. Regarding the detection range also, the combination number of two different H-scan intervals is kept identical constantly, which results in that all the pixels will be detected with respect to the same detection range. This is the feature unique to TDI architecture.

Figure 8:
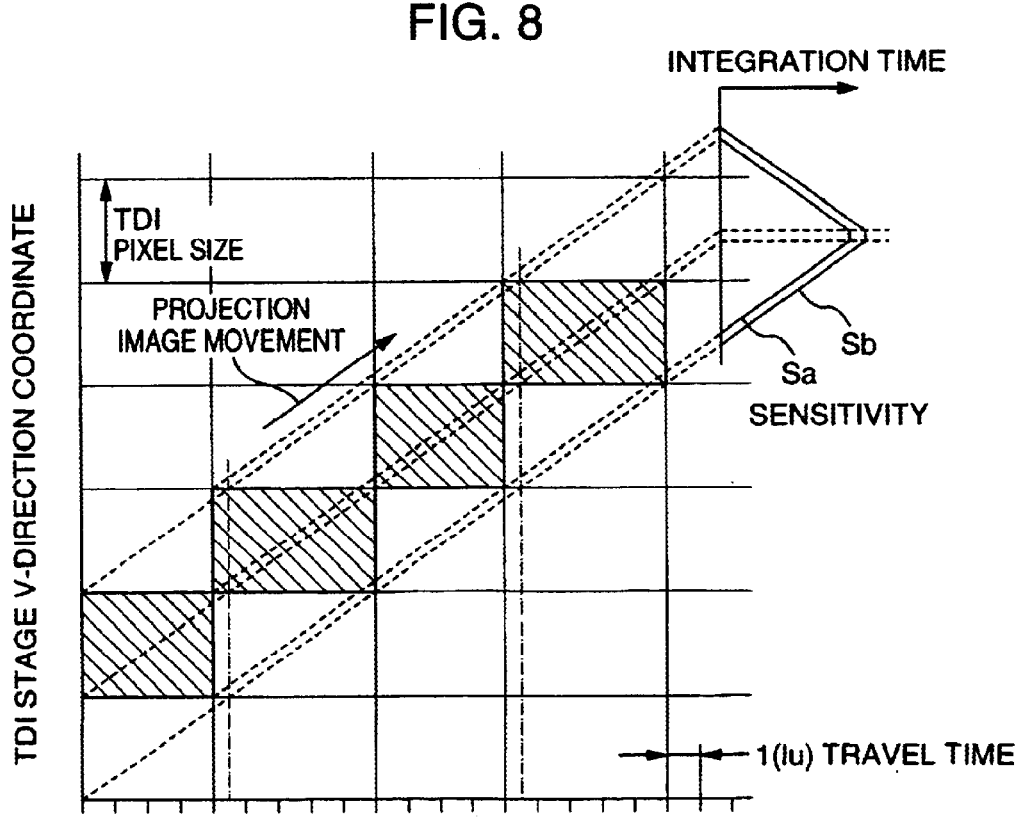
FIG. 8 is a diagram showing a relation of each detection range on an object plane by the TDI image sensor versus the sensitivity of its corresponding TDI stage.

FIG. 8 is an exemplary case where the H scan intervals, i.e. TDI stage shift pulse intervals, are repeated at 4 lu and 5 lu, indicating the detection range and sensitivity (accumulation time at each part within the detection range) of each TDI stage. The transverse axis designates a time taken for an object being sensed to move or travel, which axis is graduated in a unit time required for movement of the distance of the scale resolution lu. The vertical axis denotes the coordinates in the TDI stage direction as measured with the TDI stage dimension being as a unit.

Note here that the magnification ratio of an optical system used is such that 4.5 lu of an object being sensed is identical to the TDI pixel size (TDI stage distance). With such a setting, while the object travels 4.5 lu, an image of the object behaves to move a distance corresponding to the TDI stage width on the TDI image formation plane (vertical axis) as shown in FIG. 8.

The shift intervals of TDI stages are set at 4 lu and 5 lu; the detection ranges of some particular pixels on the moving object are indicated by regions with hatching.

The detection range of each TDI stage is the TDI pixel size 4.5 lu plus the travel distance (4 lu or 5 lu). The detection sensitivity characteristics at the upper right part of FIG. 8 may indicate a specimen surface region detectable by "ideal" photoelements shown under the assumption that the aperture ratio is 100%, along with the accumulation time within the region—namely, the relative sensitivity. This sensitivity is Sa when the shift distance is 4 lu; Sb when 5 lu.

Although respective detection ranges are 8.5 lu and 9.5 lu, the total result measures 9.5 lu because of the fact that all the detection results are added together while a projection image travels over all the TDI stages. This is merely wider than the ideal detection width by 0.5 lu.

An embodiment of a wafer visual inspection apparatus using the TDI image sensor will be explained in conjunction with FIGS. 9 to 15.

To achieve two-chip comparison for a variable density or gradation image of a wafer pattern, it should be required to detect such wafer pattern image with enhanced accuracy through precise position alignment and comparison. In addition, an increase in detection rate should also be taken into consideration due to the need for high-magnification inspection in view of the fact that product defects to be detected decrease in dimension as LSI wafer patterns increase in integration density under continuous miniaturization in device microfabrication technology. To this end, the TDI image sensor is used to execute the intended pattern detection with the X-Y stage being continuously moved at high speeds.

Figure 9:
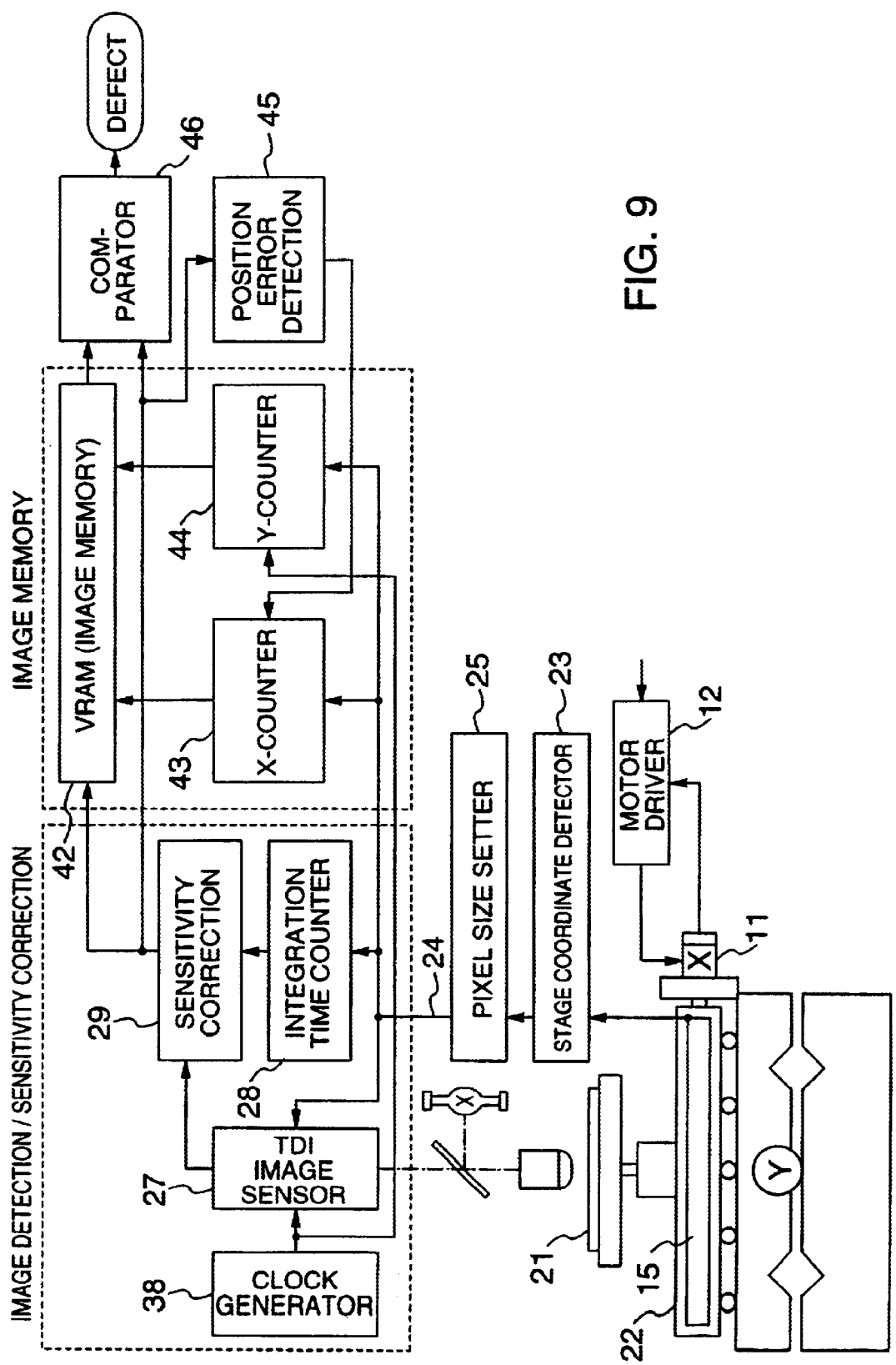
FIG. 9 is a block diagram schematically depicting a configuration of an image pickup device in accordance with another embodiment of the invention.

In FIG. 9, the pattern of a semiconductor wafer 21 mounted on the X-Y stage 22 is projected and focused on TDI image sensor 27. The X-Y stage 22 is operatively coupled to a motor 11 that is driven by a motor driver 12, which motor permits X-Y stage 22 to move or travel in the X direction (sub-scan direction).

The rotation speed of the motor 11 is fed back to the motor driver 12 for controlling the rotation speed to remain constant. However, a perfect constant speed control is practically difficult to attain, and certain speed deviations would be left. The X-Y stage 22 is equipped with a coordinate detection scale 15 that generates a scale graduation signal, which is then detected by a coordinate detector device 23 upon movement of the X-Y stage in the X direction to thereby generate a corresponding pulse signal with a predefined degree of resolution. More specifically, the coordinate detector 23 has a function of enhancing the resolution by raising the resolution of the scale 15 into twenty times, forty times and so on, and generates at its output a scale detection pulse or pulses of a presently established resolution. In response to receipt of the scale detection pulses, a pixel size setter circuit 25 generates a pulse signal for starting the internal scanning (here, the main scanning in the Y direction) of the TDI image sensor 27 every time the stage moves a predetermined distance. The TDI image sensor is responsive to this internal scan start signal 24 for operating in a way synchronized with the X-Y stage.

Also, the TDI image sensor 27 receives a clock signal generated by a clock generator circuit 38 to perform the internal scanning (Y-scan) thus enabling detection of a 2D image. The internal scan start signal 24 is the signal that determines the pixel size in the X direction. With regard to an image signal as output from the TDI image sensor, its accumulation time is detected by an accumulation time counter 28 in response to the internal scan start signal 24, and then is amended or optimized by a sensitivity corrector circuit 29.

The resulting corrected image data is written into an image memory 42, and simultaneously, is sent forth to a comparison/judgment circuit 46 along with the data pre-stored in the memory 42. In turn, the comparator 46 compares these image data items with each other to determine that a defect is present if a match does not exist therebetween.

An X-coordinate counter 43 is operable to count up pulses of the TDI image sensor scan start signal 24, whist a Y-coordinate counter 44 counts clock pulses supplied thereto. These coordinate counters 43, 44 are for address control of the image memory 42.

Upon receipt of the image sensor scan start signal, the Y-coordinate counter 44 is preset at a fixed value as will be described in detail below. A positional deviation detection circuit 45 is operable to detect any possible alignment position errors of a chip for control of the X-coordinate counter 43 and Y-coordinate counter 44 based upon the position deviation amount detected to thereby store a corresponding part of the repeat pattern into the image memory 42 at the same coordinates.

Next, an operation of each component will be explained below.

The moving speed of the X-Y stage 22 in the X-direction is ideally constant. Practically, however, the speed can vary so that it might become difficult when the image sensor is subject to the internal scanning at a fixed cycle or period to achieve exact correspondence to the actual coordinates of X-Y stage. Then, based on the graduation detection signal from the position (coordinate) detector 15 attached to the X-Y stage 22, the pixel size setter circuit 25 generates the internal scan start pulse signal 24 every time the pixel size setter 25 detects that the stage has moved or travelled a distance equivalent to one pixel size.

The internal scan start pulse 24 is for use in letting the image sensor 27 start the internal scanning operation, and is sent to the accumulation time counter 28. The accumulation time counter 28 operates to calculate an incident light amount accumulation time length (exposure time) of the TDI image sensor based on the period of the internal start pulse 24. The accumulation time of TDI image sensor may be numerically defined by calculation as the total time lengths of those internal scan start pulse intervals corresponding to the TDI stage number immediately before outputting of an image signal.

An output image signal of the TDI image sensor 27 is detectable at the sensitivity that is proportional to the accumulation time period. A speed variation of the X stage is thus observable as a deviation in accumulation time (exposure time), which can act to render variable the brightness of the image sensor output image signal. To avoid this, such variation is corrected or amended by the sensitivity corrector circuit 29 in response to an output of the accumulation time counter 28.

Figure 10:
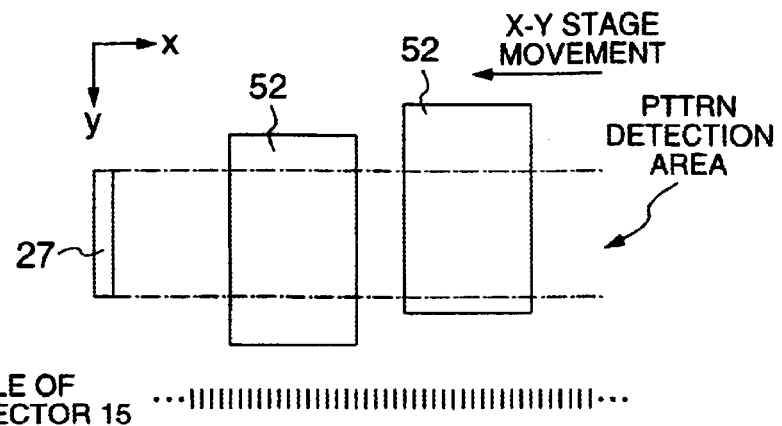
FIG. 10 is a plan view showing a relation of a chip position of a wafer versus its associative detection range.
Figure 11:
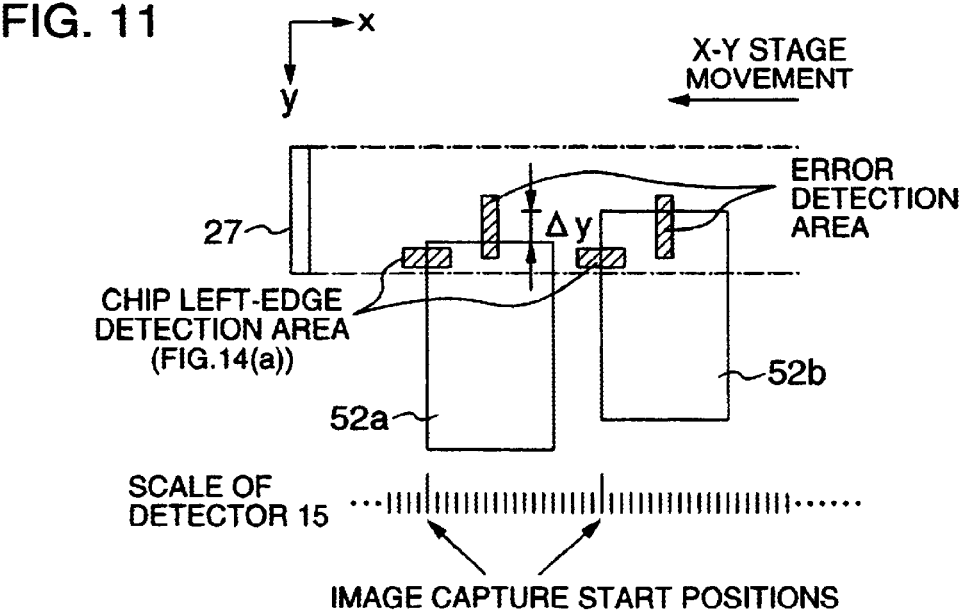
FIG. 11 is a plan view showing a relation of a wafer chip position versus a detection range.

The position error detector circuit 45 detects a position alignment error of a chip 52 as shown in FIG. 10. In regard to alignment errors in the X direction, as shown in FIG. 11, these errors may be corrected by detecting a left end edge pattern of the chip within a specified area, and then starting writing into the image memory 42. Specifically, the X-coordinate counter 43 is zero-cleared every time when the chip's left edge pattern is detected. Note however that where the X-Y stage 22 is driven to move in the opposite direction to that depicted herein, the X-coordinate counter 43 will be zero-cleared every time the chip's right edge pattern is detected.

Figure 12:
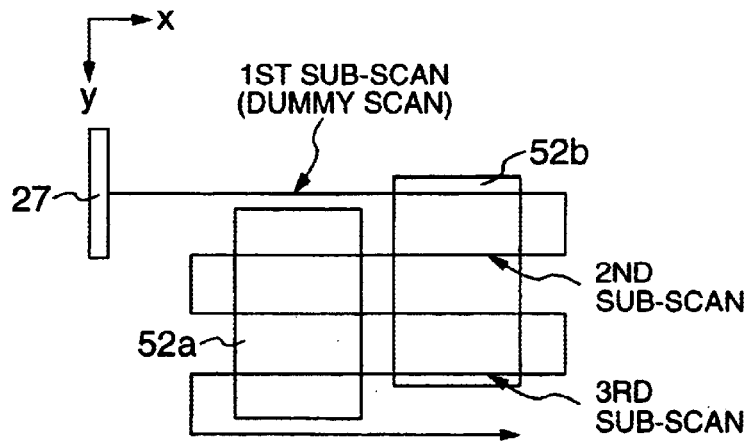
FIG. 12 is a plan view showing a relation of a wafer chip position and an image sensor scanning route.

Regarding a chip position alignment error in the Y direction, a position deviation amount $\Delta Y$ depicted has been measured in advance by detecting the upper edge pattern of a chip within a predefined area of FIG. 11 during the first sub-scanning cycle shown in FIG. 12. And, during the second sub-scanning cycle or later, the Y-coordinate counter 44 attempts to provide a certain off-set of a fixed pixel value *a with respect to a chip 52a for writing a detected pattern into the image memory 42.

For a chip 52b, an offset equivalent to $(\alpha - \Delta Y)$ pixels is provided for writing. The offset $\alpha$ is set at $\alpha \geq \Delta Y\text{max}$ by taking into account the possible position alignment error occurrence range in the Y direction, where $\Delta Y\text{max}$ is the maximum value of alignment error in the X direction.

With that, the intended pattern position alignment is done in conjunction with the X and Y directions of the chips 52a and 52b in the image memory 42, thus permitting corresponding inside patterns of these chips 52a, 52b to enter the same address.

Note that the image memory 42 may be designed to have its storage capacity merely large enough to store therein data in a limited region the image sensor 27 scans.

Figure 13:
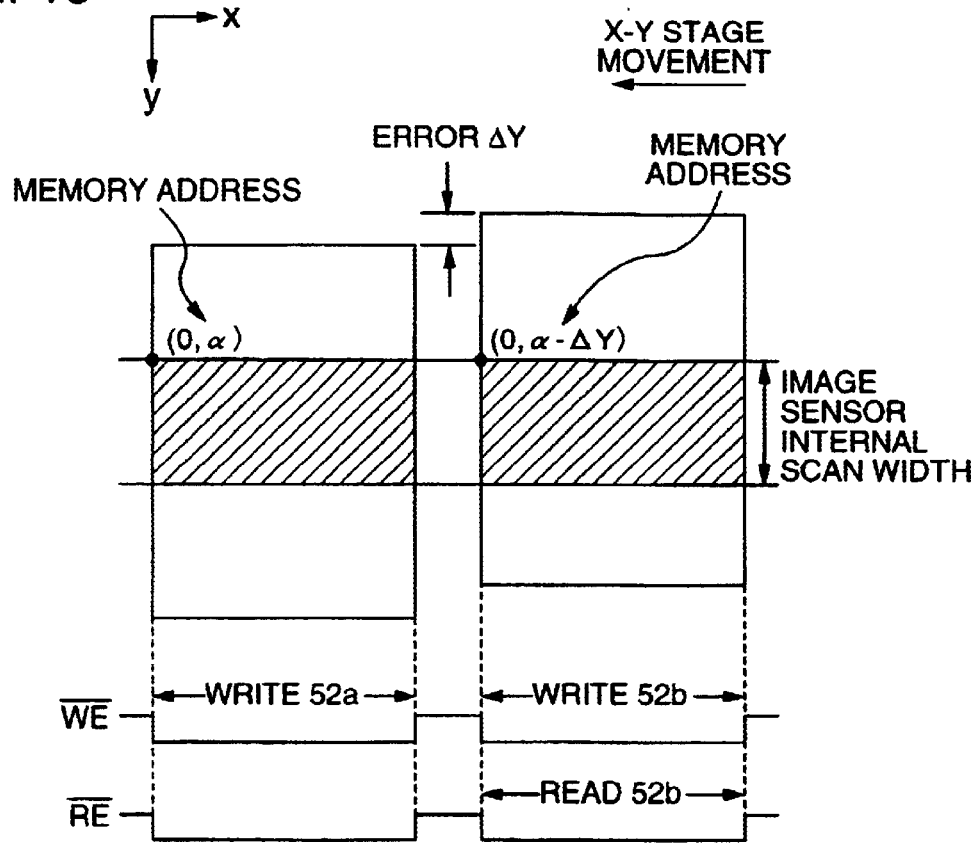
FIG. 13 is a diagram showing an example of writing and reading chip image data of a wafer into and from a memory.

The way of pattern acquisition to the image memory 42 is shown in FIG. 13. In this drawing, parts with hatching made are the portions to be written into the image memory. Reference character WE designates a command signal for writing data into the memory, whereas RE is a read command signal for reading data from the memory. More specifically, the pattern of the chip 52a is written into the image memory 42 at the address of $(x, y)=(0, \alpha)$ and its successive addresses in a sequence that the left end portion is written first. Upon detection of the pattern left edge of the chip 52b, the pattern of chip 52b is then written into image memory 42 at the address $(0, \alpha - \Delta Y)$ and its following addresses while simultaneously reading the pattern data of chip 52a out of the image memory. This image data reading is to be performed prior to the image data writing at the same addresses.

The detected pattern of the chip 52b is supplied to the comparator circuit 46 along with the chip 52a's pattern data as read from the image memory 42 for comparison to determine whether a defect is present—if no match exists, then determine that a defect must reside at a corresponding location.

Figure 14:
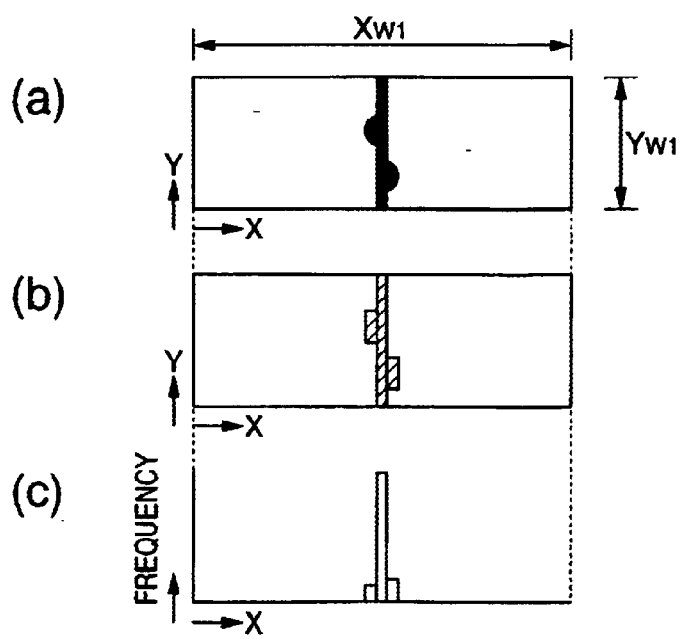
FIG. 14 is diagram showing one example of an edge detection during positional deviation detection.
Figure 15:
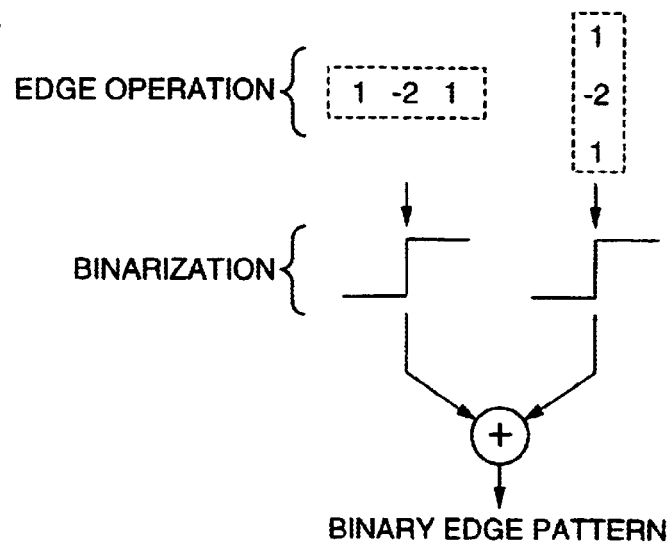
FIG. 15 is a diagram showing an example of an edge operator.

An edge detection operation of the position error detector circuit 45 is shown in FIG. 14. In FIG. 14 at (a), for example, let an edge operator shown in FIG. 15 act on a pattern within a predefined area (corresponding to the portions hatched in FIG. 11) which has a specified range XW1 in the X direction and a range YW1 in the Y direction on a chip, thereby detecting an edge as depicted in FIG. 14 at (b). Whereby, a histogram of the Y-directional edge within the range XW1 is prepared as shown in FIG. 14 at (c) for detection of a specific X-coordinate position with a maximal frequency as the edge position.

The same scheme of FIG. 14 may also be applied to detection of the pattern edge position in the X direction. The resultant edge position detected may be used to find a position alignment error of the chip, if any.

Detection of the upper edge and left edge of a chip under visual inspection for appropriate correction of any possible position alignment errors in the X and Y directions may alternatively be effectuated in a procedure which follows: detect a specific internal pattern of a chip under inspection with the XY stage being subject to idle feeding; then, calculate the coordinates of a pattern at the upper edge and the left edge of a chip by comparing the detected pattern to an initially designed reference pattern data.

Other embodiments are also available which apply the principle of the invention stated supra to image dissectors, scanning electron microscope equipment, and laser scanning microscope systems. By causing an electron or light beam to exhibit the main scanning (H-scan or X-scan) while at the same time permitting subsidiary scanning (V-scan or Y-scan) of the electron or light beam in the direction perpendicular to the main scan direction due to either beam deflection or specimen movement, the both may be combined together in an image detection device for detection of a 2D image to ensure that any possible errors occurrable at all the main scanning line positions are less than or equal to a minimal variable amount of the sub-scanning while specifically selecting the value of n so that, at the n magnification of such minimal variable amount of the sub-scanning, any resultant errors are of the negative (−) polarity with respect to the target value of the main scan-line interval which has been established at an accuracy less than the minimal sub-scan variable amount, or alternatively, the resulting errors have the positive (+) polarity when (n+1) magnification is done.

Figure 16:
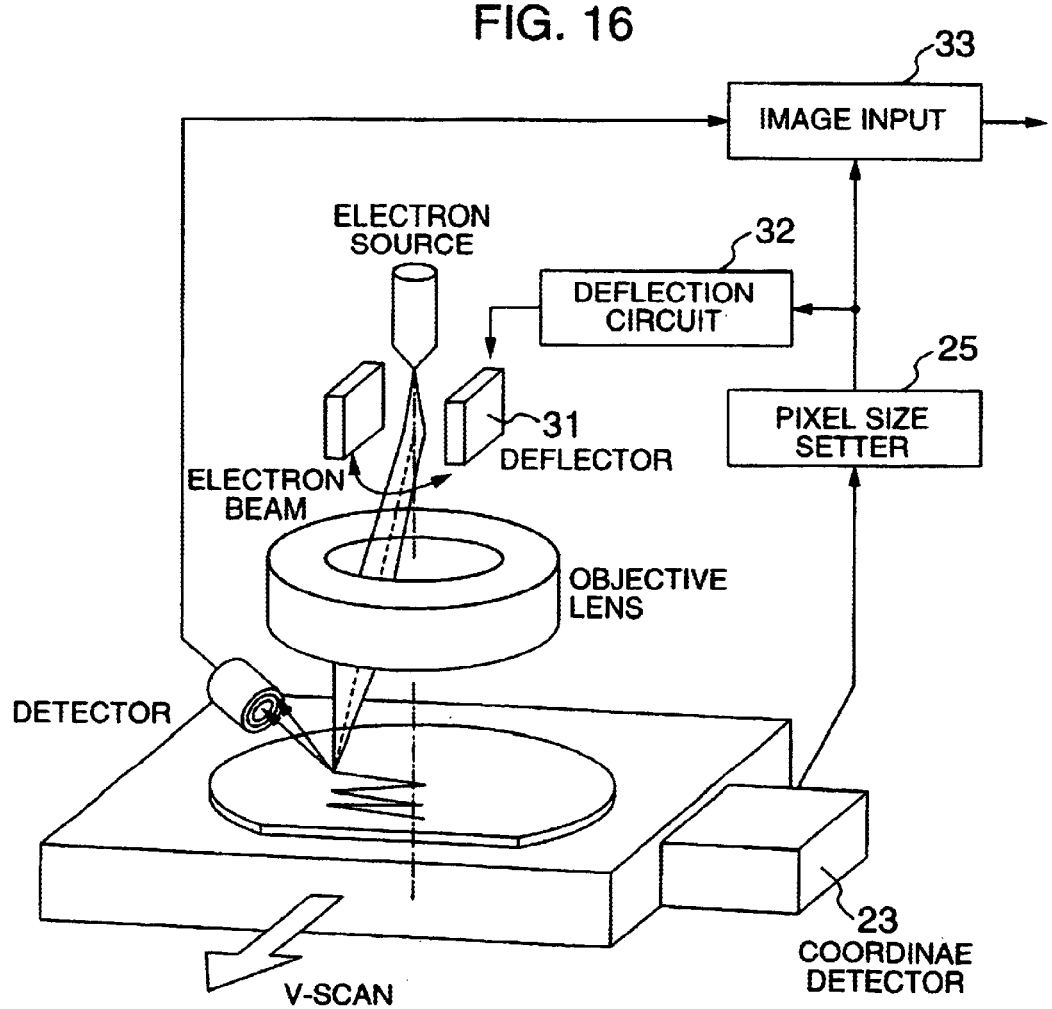
FIG. 16 is a perspective view schematically showing a configuration of an inspection apparatus in accordance with a further embodiment of the invention.

FIG. 16 illustrates a perspective view of a visual inspection apparatus also embodying the invention, which employs a scanning electronic microscope for detection of the intended image.

A specimen or workpiece such as for example a silicon wafer on an amount table moves in the V direction, and an electron beam as deflected by a pair of deflectors 31 is driven to H-scan the top surface of the workpiece. A coordinate detector device 23 is provided for detecting a movement amount in the V direction, while a pixel size setting device 25 is operable to determine or "judge" that the workpiece has traveled the intended distance corresponding to one pixel size. Upon detection of such one-pixel distance movement, the pixel size setter circuit 25 generates an H-scan start signal, which is then supplied to a deflector drive circuit 32. Simultaneously, the pixel size setter 25 provides an image input circuit 33 with a signal indicative of the start of a new H-scan cycle.

The image input circuit 33 supplies its output image data to a defect detector device.

With the embodiment of FIG. 16 also, substantially the same technical advantages are achievable as in the case of the image sensor stated supra.

It is noted that in apparatus or equipment for detecting an image based on deflection of an electron beam or light beam during V-scanning cycles, which is applicable to scanning electronic microscope systems or image dissectors or alternatively laser scanning microscopes, a minimal variable amount of such deflection amount may be equivalent to the degree of resolution of the prescribed V-coordinate detector device; hence, its relation with respect to the pixel size is common.

Figure 17:
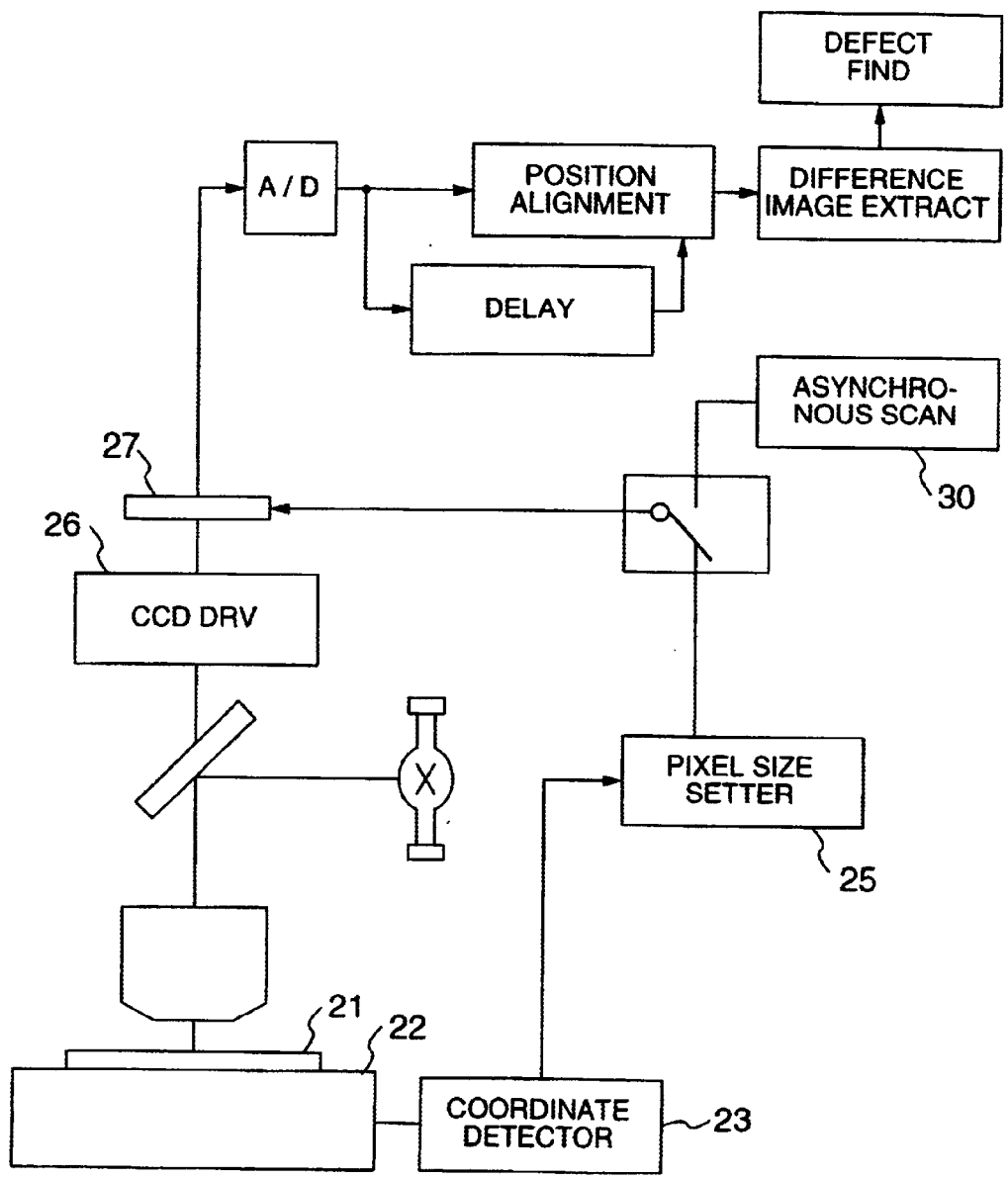
FIG. 17 is a block diagram schematically showing a configuration of an inspection device in accordance with a still further embodiment of the invention.

It is also noted that an embodiment of FIG. 17 is the visual inspection apparatus that features permitting the image sensor 27 to appropriately operate by selectively switching between an output of the pixel size setter circuit 25, which generates the H-scan start pulses synchronously with respect to movement of the workpiece mount table, and an output of an asynchronous scan-start pulse generator circuit 30 which continuously generates start pulses at predetermined cycles or periods independently of the stage coordinates.

The asynchronous operation may be required in the case the stage travel speed is not adequate for the operation of the image sensor 27, or during interruption, or in other cases where necessary. With such an arrangement, it is possible to obtain some advantages such as avoiding the risk of inoperatibilty or operation failure of image sensor 27, removing or "dumping" any unnecessary accumulated charge packets immediately before detection of a normal image, or the like.

It has been described that in accordance with the embodiments stated above, it becomes possible, for inspection apparatus of the type which performs visual inspection of an object to be sensed—typically, workpiece such as a semiconductor wafer or membrane—by detecting a 2D image through both the H-scanning and V-scanning, to divide a desired distance segment in the V direction into portions of a given number of pixels.

In addition, since the pixel size may be set with certain accuracy exceeding the scale resolution, it becomes possible by use of software-based operations to render the pixel size on an object identical exactly to a specific dimension that is determinable depending on the magnification factor of an optical image formation system employed.

Further, the positional relation of a detected image pattern and pixels may be established with enhanced accuracy, which in turn enables comparison performance to further increase during pattern comparison test/inspection procedures.

Furthermore, the prescribed embodiments are distinguishable over the prior art in that the former may noticeably improve the accuracy of the pixel size to be set while successfully accommodating strict demands for further enhancing the performance of the coordinate detector device with production costs being reduced or minimized.

Moreover, as the advantage obtainable when applied to visual inspection apparatus or systems, it is possible to suppress the limitation due to the resolution of the coordinate detector device with respect to the pixel size setting, thus increasing the flexibility.

Although the invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

What is claimed is:

1. A method for sensing by a linear image sensor a two-dimensional image of an object to be sensed, the method comprising the steps of:

detecting a position of the object by a position sensor having a first resolution;

picking up an image of the object being projected in a direction (V-scan direction) generally perpendicular to an internal scan (H-scan) direction of the linear image sensor in synchronism with relative movement between the object and the linear image sensor;

periodically switching a pixel size along the first direction between a plurality of predefined pixel sizes during the relative movement between the object and the linear image sensor in accordance with information of the relative movement detected by the position sensor; and producing from an output of the linear image sensor a two-dimensional image of the projected image having a second resolution of the object to be sensed;

wherein the second resolution is a higher resolution than the first resolution.

2. The method of claim 1, wherein the switching of the pixel size is performed at a timing of a position detection signal in the V-scan direction of the object to be sensed.

3. The method of claim 1, wherein the switching of the pixel size in the V-scan direction is performed by changing a distance of the H-scan.

4. A method for picking up a two-dimensional image of an object to be sensed by use of a linear image sensor, the method comprising the steps of:

detecting a position of the object by a position sensor having a first resolution;

picking up an image of the object being projected in a direction (V-scan direction) generally perpendicular to an internal scan (H-scan) direction of the linear image sensor in synchronism with relative movement between the object and the linear image sensor;

periodically changing an interval of start of each H-scan during the relative movement between the object and said linear image sensor in accordance with information of the relative movement detected by the position sensor; and producing from an output of the linear image sensor a two-dimensional image of the projected image having a second resolution of the object to be sensed;

wherein the second resolution is a higher resolution than the first resolution.

5. The method of claim 4, wherein the step of periodically changing the interval of start of each H-scan includes the step of periodically changing an interval of start pulses for starting an interval scan of the linear image sensor.

6. The method of claim 5, wherein a position detection signal in the V-scan direction of the object to be sensed is used as the interval of the start pulses.

7. An image pickup device of a two-dimensional image of an object to be sensed, the device comprising:
- a linear image sensor;
- an X-Y stage for moving said object to be sensed and for permitting a projected image of said object which is projected onto said linear image sensor to move in a direction (V-scan direction) generally perpendicular to an internal scan (H scan) direction of said linear image sensor;
- a position detector for outputting a position detection signal representative of a position of said object to be sensed with a first resolution;
- a linear image sensor driver which controls said linear image sensor to detect said image of said object in synchronism with the position detection signal outputted from said position detector; and
- pixel size change means for periodically changing a pixel size in said V scan direction of said linear image sensor on the basis of said position detection signal to produce a two-dimensional image having a second resolution;
- wherein said second resolution is a higher resolution than said first resolution.

8. The image pickup device of claim 7, further comprising means for amending a sensitivity of said linear image sensor based on said pixel size changed.

9. An image pickup device of a two-dimensional image of an object to be sensed, the device comprising:
- a linear image sensor;
- an X-Y stage for moving said object to be sensed and for permitting a projected image of said object which is projected onto said linear image sensor to move in a direction (V-scan direction) generally perpendicular to an internal scan (H scan) direction of said linear image sensor;
- a position detector for outputting a position detection signal representative of a position of said object to be sensed with a first resolution;
- a linear image sensor driver which controls said linear image sensor to detect said image of said object in synchronism with the position detection signal outputted from said position detector; and
- start control means for periodically changing based on said position detection signal an interval of start of said H scan of said linear image sensor to produce a two-dimensional image having a second resolution;
- wherein said second resolution is a higher resolution than said first resolution.

10. The image pickup device of claim 9, wherein said start control means for periodically changing the interval of start of said H-scan includes means for periodically changing an interval of the start pulses for starting an interval scan of said linear image sensor.

11. A method for detecting a two-dimensional image, comprising:
- projecting an image of a specimen onto an image sensor;
- moving the specimen to a direction while projecting the image onto the image sensor;
- detecting the image of the specimen with said image sensor in synchronism with the movement of the specimen, a position of the specimen being detected by a position sensor having a first resolution;
- controlling a scan timing of said image sensor periodically to scan perpendicularly to the moving direction; and
- forming a two-dimensional image of the specimen with a second resolution from an output of the image sensor;
- wherein the second resolution is a higher resolution than the first resolution.

12. The method of claim 11, wherein the image sensor is an array of linear sensors and in the step of controlling, an interval scanning start timing of each of the linear sensors is controlled.

13. A method for detecting a two-dimensional image, comprising:
- projecting an image of a specimen onto an image sensor;
- sensing a relative movement between the specimen and the sensor with a first resolution;
- detecting the image of the specimen with the image sensor using information of the sensed relative movement;
- periodically changing an internal scan timing of the image sensor in accordance with information of the sensed relative movement; and
- forming a two-dimensional image of the specimen with a second resolution from an output of the image sensor;
- wherein the second resolution is a higher resolution than the first resolution.

14. The method of claim 13, wherein the sensor is a TDI image sensor and a direction the relative movement is perpendicular to an interval scan direction to the TDI image sensor.

15. A method for detecting a two-dimensional image, comprising:
- projecting an image of a specimen onto an image sensor through a projection unit;
- moving a stage to a direction on which the specimen is mounted while projecting the image onto the image sensor;
- detecting the image of the specimen with said image sensor in synchronism with the movement of the stage; and
- forming a two-dimensional image of the specimen from an output of the image sensor;
- wherein a pixel size on the specimen of the image sensor is set by software-based operation to be identical to a specific dimension determined by the projection unit.

16. The method of claim 15, wherein the image sensor is a TDI image sensor.

17. The method of claim 15, wherein the movement of the stage is detected by a position sensor having a first resolution and the two-dimensional image of the specimen formed from the output of the image sensor has a second resolution which is a higher resolution than the first resolution.

* * * * *

UNITED STATES PATENT AND TRADEMARK OFFICE
CERTIFICATE OF CORRECTION

PATENT NO. : 7,221,486 B2 Page 1 of 1
APPLICATION NO. : 10/265659
DATED : May 22, 2007
INVENTOR(S) : Makihira et al.

It is certified that error appears in the above-identified patent and that said Letters Patent is hereby corrected as shown below:

Title page, item
(30) Foreign Application Priority Data should read

--June 27, 1997 (JP) ….. 09-171454--

Signed and Sealed this

Twenty-third Day of October, 2007

JON W. DUDAS
*Director of the United States Patent and Trademark Office*